United States Patent Office 3,303,121
Patented Feb. 7, 1967

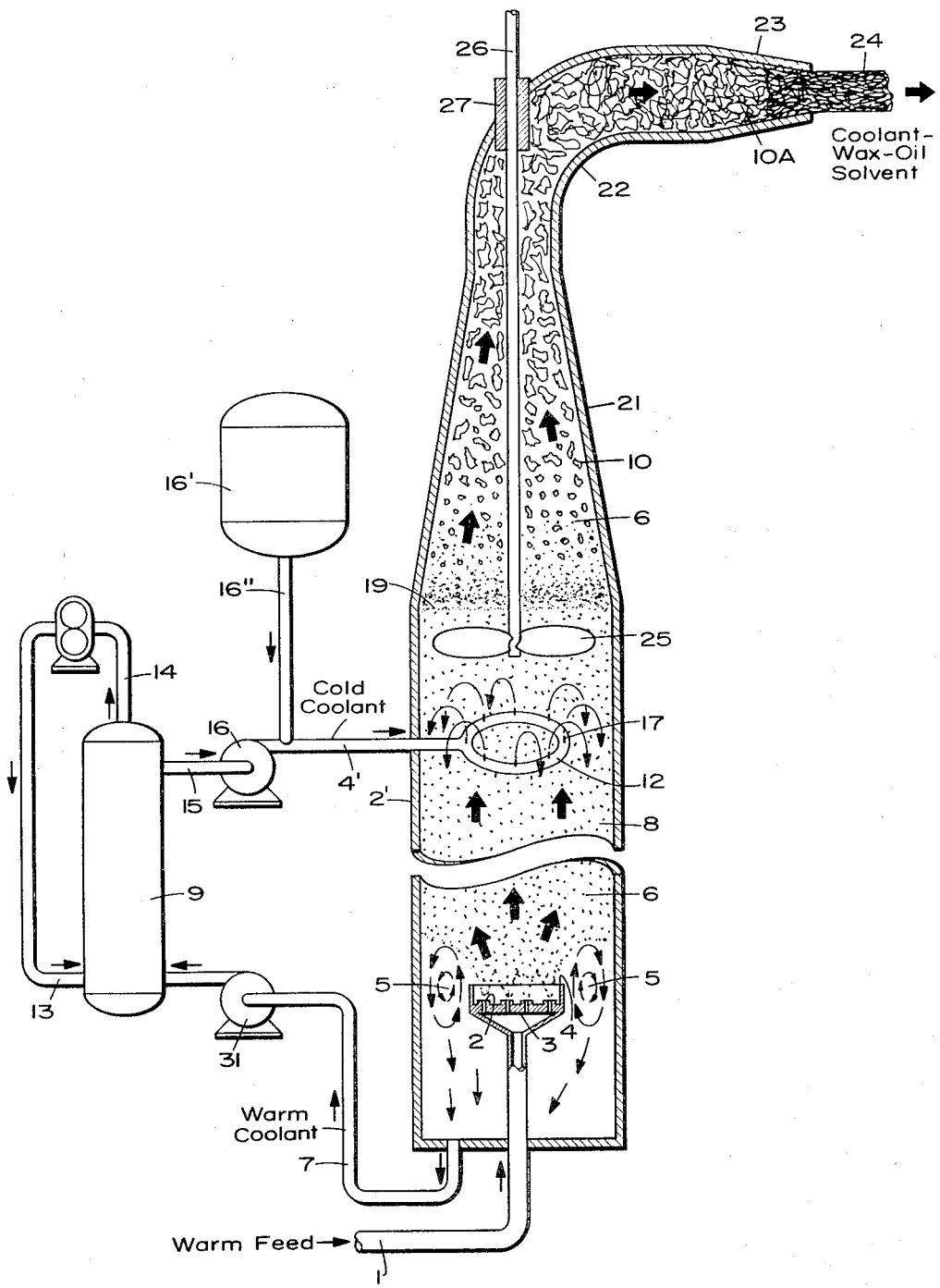

3,303,121
ADDITIVES FOR MAINTAINING A DENSE DISPERSION OF CRYSTALLIZABLE MATERIAL IN COUNTERCURRENT CONTACT WITH AN IMMISCIBLE COOLANT
Norman N. Li, Fords, and Leonard B. Torobin, Newark, N.J., assignors to Esso Research and Engineering Company, a corporation of Delaware
Filed July 1, 1964, Ser. No. 379,677
23 Claims. (Cl. 208—37)

This is a continuation-in-part of earlier filed application U.S. Serial No. 350,957, filed March 11, 1964.

This invention relates to a process and apparatus for separating a crystallizable material from a liquid feed in which said material is soluble at certain temperatures and insoluble at lower temperatures. The liquid feed containing the crystallizable material in solution is introduced into a cooling tower as a dispersed phase of essentially uniform size droplets and contacted countercurrently with a continuous phase immiscible coolant whereby the feed is cooled and the crystallizable material in the dispersed phase is crystallized from solution.

This invention specifically relates to an improved process for improving heat transfer rate of materials which tend to stick within the tower while preventing drop sticking and breakup. As a result, the dispersed phase of essentially uniform size droplets is maintained. A dispersed phase of essentially uniform size droplets is essential to proper heat transfer.

Various attempts have been made to find a simple, efficient and economic method for crystallizing material from their solutions. Efficient operation to date has, in most cases, been limited by the equipment and techniques developed which had either limited efficiency or limited throughput of feed material. A major problem encountered was to maintain the flow of the suspension of crystallized material in the mother liquor in the chilling apparatus at the low temperatures required to carry out the crystallization step. Another problem was the inability to handle the suspensions at crystallization temperatures below the pour point of the suspension.

In a process described recently, feed containing a crystallizable material is fed to a treating tower at a temperature above the crystallization temperature of the crystallizable material in the feed and contacted with an immiscible coolant. Feed enters the column either at the top or bottom of the column, depending on whether it is more dense or less dense than the coolant. The feed is introduced into the column as a dispersed spray of essentially uniform size droplets. The coolant is introduced into the opposite end of the column through an inlet means and forms a continuous liquid coolant phase and moves countercurrently to the dispersed droplets. The coolant is introduced into the tower at a temperature below the crystallization temperature of the crystallizable materials in the feed. By the time the relatively dense bed of droplets reaches the opposite end of the column from which they were introduced, a part of or substantially all of the crystallizable materials in the droplets can be crystallized or precipitated out of solution of the feed material.

This process has overcome the requirement in the prior art processes of maintaining the crystallized material mother liquor suspension in a fluid condition during the crystallization step. Because the feed containing the crystallizable material is introduced as a dispersed phase, the fluidity needed in the system during the chilling and crystallization steps is provided by the continuous phase liquid immiscible coolant which is interspaced between each of the spray droplets containing the crystallized material.

Recently, it has been discovered that when certain crystalline feed materials are present within the chilling tower drop sticking and/or coalescing results in the formation of aggregates of stuck droplets and lumps of coalesced slurry which reduce heat transfer coefficients two to threefold in comparison to nonsticking drop systems. Attempts have been made to alleviate this drop sticking. However, these attemtps have produced the negative effect of breaking up the dense dispersion of droplets by producing a prohibitively wide distribution of drop size. This serves to greatly hinder the operation of the tower. Thus, a method of preventing drop sticking which would simultaneously avoid the dispersing of the substantially uniform size droplets is needed.

According to this invention, it has been unexpectedly found that a complex of surfactant, protein and a macromolecule used as a brine additive is effective in preventing both drop sticking and breakup in the chilling tower. The use of this mixture in the tower can, therefore, improve heat transfer rate and column throughput. It is also within the scope of this invention to add surfactant and macromolecule alone, as well as a surfactant and protein, to the system.

Any of the well-known surfactants may be utilized in this invention. Preferred surfactants are the brine surfactants. Examples of useful brine surfactants include saponin and Igepal either along or in mixture. Igepal is a nonionic surfactant, nonylphenoxypolyethyleneoxy ethanol. It is a trademark of the General Aniline & Film Corp. and has the general configuration $RC_6H_4O(CH_2CH_2O)_{n-1}CH_2CH_2OH$ where R may be $C_8H_{17}$, $C_9H_{19}$ or $C_{10}H_{21}$ and $n$ varies from 1.5 to 100. The surfactant, protein and macromolecule may be dissolved in water and then added to the coolant. This is the preferred method. Alternatively, the surfactant, protein and macromolecule may be added to the brine. Heating may be required to obtain a solution. The protein may comprise any of the well-known proteins such as gelatin. Particularly preferred are those proteins which belong to the scleroprotein family. These proteins are characterized as being rich in glycine and lycine. More specifically, the macromolecule may be a polyglycol, the two most common polyglycols being polypropylene and polyethylene glycol. Polyethylene glycol is preferred. The desirable weight range for use of these polyglycols is between 500 and 12,000. A preferred weight range would be about 600 to 8,000 and most preferably, 5,000 to 6,000. The preferred surfactants are the brine surfactants and, in particular, the nonionic brine surfactants such as Igepal, a trademark of the General Aniline & Film Corp.

In its most specific form, the complex to be added consists of saponin and Igepal as the surfactants. Saponin and Igepal may be added individually to the complex or as is preferred, they may be added in admixture. For the protein component, it is preferred to utilize gelatin. The macromolecule which is most desirable for this invention is polyethylene glycol at a weight of 5,000 to 6,000.

Turning now to the constituents of the complex which is to be added, saponin is better known as sapogenin glycoside. It is a type of glycoside which is widely distributed in plants. All saponins foam strongly when shaken with water. They form oil in water emulsions and act as protective colloids. Each saponin molecule consists of a sapogenin which constitutes the aglucon moiety of a molecule and a sugar. The sapogenin may be a steroid or a triterpene and the sugar moiety may be glucose, glactose, a pentose or a methyl pentose. A further study of saponin has been made by R. J. McIlroy, "The Plant Glycosides" (Edward Arnold & Co., 1951), Chapter 9. This study is herein incorporated by reference. Saponin has been hypothesized according to Hackh's Chemical Dictionary by Julius Grant, 3rd edition, 1944 (McGraw-Hill Book Company, Inc.) as having a formula $C_{32}H_{54}O_{18}$ and a molecular weight of 726.5. It is described as a glucoside from soapwort, wood, quillaia and other plants. It is a white amorphous powder which is soluble in water; the solution foams like soap when shaken. Other sources of saponin include soap roots and soap bark. No intention exists to be bound by any particular formula since there is authority to the effect that saponin has not been completely identified as yet.

Igepal is a trademark for a series of nonionic surfactants which are useful as detergents, dispersants, emulsifiers and wetting agents. The trademark belongs to General Aniline & Film Corp. It refers to alkyphenoxy poly (ethyleneoxy)-ethanols which arise from the combination of an alkyl phenol with an ethylene oxide. The general formula is $RC_6H_4O(CH_2CH_2O)_{n-1}CH_2CH_2OH$ in which R may be $C_8H_{17}$, $C_9H_{19}$ or $C_{10}H_{21}$ or a higher homolog and $n$ is the number of moles of ethylene oxide to be utilized. $n$ varies from 1.5 to 100, preferably, 1.5 to 30 and, most preferably, 4 to 30. In each series, the solubility in water and electrolyte solution increases as the ethylene oxide content increases. The Igepals are more completely defined in Zimmerman and Lavine, "The Handbook of Material Trade Names," Supplement 3 to the 1953 edition (Industrial Research Services Inc., 1960), pages 123 and 124. These pages are herein incorporated by reference.

With respect to gelatin, this is a protein obtained from collagen by boiling skin, ligaments, tendons, bones, etc., with water. Its product differs from that of glue in that the raw materials are selected, cleaned and treated with special care so that the resulting product is cleaner, purer and generally clearer and lighter in color than glue. The definite composition of gelatin is not known, but it is known to have an approximate amino acid content of glycine 25.5%, alanine 8.7%, valine 2.5%, leucine 3.2%, isoleucine 1.4%, cystine and cysteine 0.1%, methionine 1.0%, phenylalanine 2.2%, proline 18.0%, hydroxyproline 14.1%, serine 0.4%, threonine 1.9%, tyrosine 0.5%, aspartic acid 6.6%, glutamic acid 11.4%, arginine 8.1%, lysine 4.1%, histidine 0.8%. The total is over 100% because water is incorporated into the molecules of the individual amino acids. Nutritionally, gelatin is an incomplete protein lacking tryptophan and containing but small amounts of other important amino acids.

With respect to composition of the complex, it would be as follows. Surfactants: saponin, 0.002 to 0.03 weight percent, and Igepal, 0.0003 to 0.003 weight percent. Protein: gelatin, 0.006 to 0.06 weight percent, and macromolecule polyethylene glycol, 0.01 to 0.15 weight percent.

The additive is formed in a ratio of 8 to 20 parts by weight of surfactant, 20 to 30 parts by weight of protein, and 50 to 70 parts by weight of macromolecule. The preferred coolant is brine.

The additive is added to about 99.99 to 99.0 wt. percent of a coolant such as brine, preferably 99.96 to 99.6 wt. percent, most preferably 99.94 to 99.8 wt. percent. Additive should constitute 0.01 to 1.0 wt. percent, preferably 0.06 to 0.2 wt. percent.

Saponin and Igepal may be used together as the surfactant or may be used separately. The preferred method is in conjunction with one another.

The following theory is advanced as to why this additive is as effective as results indicate. However, no intention is expressed to be bound by any particular theoretical mechanism. The surfactant serves to form a molecular adsorption film at the surface of the oil droplets. The oil droplets are now made hydrophilic by the surface molecules and will no longer stick together. The presence of the surface films decreases the interfacial tension which eventually leads to drop breakup. To overcome this particular aspect of the problem, mainly adsorbing surfactant molecules at the brine-oil interface without at the same time lowering the interfacial tension to such a degree as to cause drop dispersion, the complex which consists of protein and a macromolecule used in conjunction with a surfactant is added to the brine. The bulky hydrophilic end groups will not only armor the oil droplets preventing drop sticking or coalescing but also present a desirable steric effect resulting in a reduction of the number of surfactant molecules needed to form the surface adsorption films. A several-fold increase in the heat coefficient of a system will result from the addition of the additive described in this invention because it preserves the constant drop size diameter in the tower.

As mentioned in copending application S.N. 350,957, filed March 11, 1964, a countercurrent contacting tower having a gradual constriction at the end of the tower from which the collapsed phase is removed may be used. The tower is operated at positive pressure. Feed is introduced into the tower as a dispersed assemblage of essentially uniformly sized droplets. The additive is added along with the coolant which in this case is brine. The dispersed spray is made up of a relatively dense moving bed of droplets which move in the tower countercurrently to a continuous coolant phase. The continuous liquid coolant phase is introduced into the opposite end of the column through a suitable inlet means and moves countercurrently to the moving bed of droplets in which crystals are being grown.

Turning to the drawing, the figure is a diagrammatic elevational view of an immiscible cooling crystallization apparatus comprising a chilling tower for crystallizing crystallizable feed material.

The feed containing the material to be crystallized should remain fluid under the conditions of spraying in the tower. The crystallizable material should be, in most cases, completely dissolved in the feed prior to spraying. In order to prevent the formation of an emulsion or the entrainment of dispersed phase feed droplets in the coolant, there must be a sufficient density difference between the coolant and the feed so that the countercurrency is maintained by gravity flow. The density difference should exist even after the crystallizable material in the feed crystallizes in the feed droplets so that the crystals in the mother liquor continue to flow countercurrent to the coolant. The feeds that can be used in accordance with this process include any feed in which there is a crystallizable material which can be separated from the feed on cooling the said feed. Feeds will include chemicals such as benzene and paraxylene as well as pharmaceuticals. The process is especially applicable to crystallizing wax from hydrocarbon fractions, particularly distillate fractions. The distillate fractions generally have a boiling range below 900° F. and contain crystalline waxes. The crystalline wax materials are considered to be high angle of repose materials where structure is predominant and heretofore have required high solvent dilution ratios to maintain fluidity of the wax-oil slurry during crystallization. The waxes utilized for this invention are characterized as being very crystalline wax materials. Very crystalline wax materials are derived from distillate stocks rather than residual stocks. Examples of very crystalline wax materials include the following crystalline feeds, Solvent 100 Neutral having a boiling range of 670° to 800° F. and a viscosity of 100 SSU at 100° F., Solvent 450 Neutral having a boiling range of 800° to 950° F. and a viscosity of 450 SSU at 100° F., and Barossa 56 having a boiling range of 820° to 970° F. and a viscosity of 500 SSU at 100° F.

The coolant used to cool dispersed phase must be substantially immiscible with the feed. The density difference between the coolant and the feed should be sufficient to maintain countercurrency in the column under all conditions of operation. The coolant should be sufficiently fluid at the cooling temperatures used that the dispersed phase feed droplets move easily through the continuous cooling phase.

Suitable coolants for use in petroleum dewaxing are water, aqueous salt solutions, aqueous calcium chloride brine solutions and the like. The concentration of salt in the water, for example, calcium chloride brine, can be adjusted to obtain the desired density of the coolant and to lower the freezing point of the coolant to the temperature at which the petroleum friction is to be dewaxed.

The feed to be crystallized can be introduced into the tower at a rate of 15 to 325 cu. ft. per sq. ft. of column cross section per hour. Rates of 35 to 150 cu. ft. per sq. ft. per hour are preferred. However, rates of 25 to 250 cu. ft. per hour can also be used. The relative rate at which the feed and coolant are fed to the tower will depend on the feed temperature, the coolant temperature, the final crystallization temperature desired, the effective height of the tower, and the volume hold-up. Feed and coolant are introduced into the tower at a sufficient rate to provide the desired chill rate and desired temperature gradient between the coolant and the dispersed feed phase. Coolant is introduced to the tower at the rate of about 5 to 200 cu. ft. per sq. ft. of column cross section per hour, though rates of 10 to 100 cu. ft. per sq. ft. are preferred; however, rates of 10 to 150 cu. ft. per sq. ft. can also be used.

The complex to be utilized by the instant invention is preferably introduced into the tower along with the coolant but may be introduced at any point. The complex as mentioned previously comprises a surfactant, a protein and a polymer, preferably a mixture of Igepal and saponin as the surfactant, gelatin as the protein and polyethylene glycol of 5,000 to 6,000 molecular weight as the polymer. The Igepal to be added will have the general configuration $RC_6H_4O(CH_2CH_2O)_{n-1}CH_2CH_2OH$ where $R=C_9H_{19}$ and $n=9$ or 10. In this fashion the brine additive is effective in preventing sticking and coalescing of oil droplets in which crystals are grown within the chilling tower. The use of the brine surfactants and colloid results therefore in a three to fourfold increase of heat transfer coefficient.

After filling the column with the coolant, the feed containing the crystallizable material is introduced into the column through a spray inlet means which produces essentially uniform sized droplets. Though it is preferred to operate with very narrow drop size distribution, efficient operations have been carried out where the drop size has varied between 10 to 30% from the average drop size diameter and efficient heat exchange was still obtained. However, for better results, this variation from the average size is preferred to be kept down to 10 to 20%. The size of the orifice holes of the spray head through which the feed is introduced is selected to produce the desired droplet size for the particular feed being treated. Orifice holes can be selected to produce drop sizes of ⅜ to 1/32" in diameter and preferably about ¼ to 1/24" in diameter. A sufficient number of orifices is provided in the spray head used to produce a sufficient amount of the drops of the desired size to obtain the desired feed throughput and volume holdup.

The major factor controlling the chill rate is the rise velocity of the droplets in the continuous phase. The rise velocity can be mostly directly controlled by controlling the volume holdup of dispersed phase droplets in the cooling tower. The volume holdup is determined by the rate of introduction of the dispersed phase in the bottom of the column. By withdrawing the dispersed phase more slowly than it is introduced, the tower will gradually fill with dispersed phase. High volume holdup provides slower chill rates, higher throughput and generally more efficient heat transfer than the column. The volume holdup can be as low as 10% up to about 85%. Volume holdup of 15% up to less than 50% can be used. Preferably, the holdup is controlled between 35 and 60% because it is within this range that more efficient heat exchange is obtained. Volume holdup of 50 to 80% as well as 65 to 77% can also be used depending on the feed being treated.

The tower can be operated under the conditions to produce chill rates between less than 1° per minute up to chill rates of 150° F. per minute and still obtain easily separable precipitated crystalline materials. Depending on the feed, chill rates of more than 15° F. per minute, up to 150° F. per minute, can be used. Chill rates of 0.25° to 15° F. per minute, of ½° to 7° F. per minute and of 1° to 3° F. can also be used. Preferably, the tower is operated in such a manner as to obtain chill rates of 30° to 100° F. per minute. The best chill rate to be used with a particular feed and coolant to obtain the best results will depend on the feed and coolant used.

The best temperature gradient for good crystal growth between the dispersed droplet in which the crystal is forming and the continuous coolant phase will also vary with the particular material being crystallized. It is found that a temperature difference of greater than 40° F. results in the formation of wax crystals which are difficult to separate from the mother liquor. However, this maximum upper limit of 40° F. would depend on the particular type of material being treated. With some materials it may be a little lower, with others a little higher, and would vary somewhat with whether or not a solvent or crystal modifier were used with the material. A temperature gradient corresponding to a temperature difference of 0.5° to 30° F., more generally 0.5° to 20° F., and preferably from 1° to 10° F. can be used. An efficient operation can be carried out by maintaining the maximum temperature difference between the continuous coolant phase which contains the colloid additive and the dispersed phase of more than 10° F. up to 30° F.

The tower will be operated in such a manner as to obtain close temperature approaches at the top and bottom of the column to insure efficient heat exchange and economy of operation. The temperature approach at the top of the column will be within the range of about 1° to 40° F., generally within the range of 1° to 30° F., and more generally of 1° to 10° F. A temperature approach at the top of 1° to 20° F. can also be used. In a balanced system, the temperature approach at the bottom of the column will also be in the range of 1° to 40° F., generally 1° to 30° F. and more particularly, 5° to 20° F. The temperature approach at the bottom can also be 1° to 10° F.

Turning now to the figure, a continuous phase coolant which may be calcium chloride brine solution is introduced into the top of the tower 2 through upward pointing orifice openings 17 on circular ring 12. Within reservoir 16' is a complex, the said complex is composed of Igepal as described previously, saponin, gelatin and polyethylene glycol molecular weight of about 6,000. About 1 to 7% by weight of this complex is mixed with 93 to 99% by weight of coolant. The complex passes from reservoir 16' through line 16" and is deposited within conduit 4' from whence it passes into the tower. The coolant which is brine is introduced through line 4' initially at about ambient temperature and is fed into the tower until the tower is completely filled with coolant. After the tower is filled with coolant, a very crystalline petroleum hydrocarbon fraction containing 3 to 30 wt. percent wax, based on feed, is introduced into the tower at about ambient temperature through line 1 and through spray head orifice plate 3. The spray head is surrounded by annular vertical baffle 4.

The feed is introduced into the tower at a temperature above its pour point, for example, 40° to 160° F. The annular baffle 4 is placed at the outer edge of spray head plate 3 and extends vertically upward from the outer edge of plate 3 for a distance of about ⅛ the spray head diameter. The baffle 4 deflects the standing vortex 5 of the continuous cooling phase outward and away from the vicinity of the spray head. As the dispersed phase is introduced into the tower, it displaces continuous coolant phase with the additive which is removed through the wax slurry outlet line 24. When the desired rate of introduction of the dispersed phase is reached, the coolant is again introduced into the top of the tower and withdrawn through coolant outlet line 7 at a rate sufficient to balance the system. Initially, during start-up, the exit of coolant through line 24 is caused by the introduction of the feed liquid into the tower since room must be made for this liquid. Once countercurrence is established in the tower, the inlet temperature of the coolant is gradually reduced until the desired dewaxing temperature is reached. The wax in the feed is crystallized and the dispersed droplets concentrate in the top of the column and a sharp concentration gradient 19 is established between dispersed phase in continuous phase coolant and collapsed dispersed phase containing only a minor amount of entrained coolant. Excess coolant and additive over that withdrawn through coolant outlet line 7 is introduced through line 4 to compensate for coolant entrained in the wax-oil slurry leaving with slurry through slurry outlet line 24.

The coolant can be introduced suitably at a temperature of —45° F. to +40° F., depending upon the particular feed being treated. The temperature approaches at both ends are within 1° to 30° F. and sufficient dispersed phase is introduced to obtain a volume holdup of dispersed phase of about 30 to 60 vol. percent. Under these conditions, efficient heat exchange between coolant and dispersed phase is obtained.

The waxy oil feed introduced through spray plate 3 forms a dense dispersion of essentially uniform diameter droplets 6 of ⅜ to ½₀″ in diameter, which rise at a rate in the column of about 2 to 50 ft./min. The feed is introduced into the column at a rate of about 25 to 250 cu. ft./sq. ft. of column cross section per hour. The coolant is introduced at a ratio of about 1 part coolant to 2 to 2½ parts of petroleum fraction feed or about 10 to 150 cu. ft./sq. ft. of column cross section per hour. The continuous coolant phase countercurrently contacts the rising dense dispersion of oil droplets cooling them at a controlled rate of 30° to 80° F./min. while maintaining the temperature difference between the dispersed phase droplet and the coolant phase of between 1° and 30° F.

Furthermore, the colloid in the coolant serves to maintain the droplets in a dispersed phase and prevents drop sticking. At the same time the use of the colloid also prevents the dispersion of the dispersed phase droplets. In this manner maximum utilization of heating capacity is acquired for there is no drop sticking to prevent maximum utilization of the total droplet of coolant surface area to aid in the cooling of the wax phase. As the oil droplets are cooled from their inlet temperature to the exit temperature in the top of the column, the wax present in the spray droplets crystallizes out of solution.

The upward movement of the dense dispersion of essentially uniform size waxy oil droplets is indicated by the open arrows while the downward countercurrent flow of the continuous coolant phase is indicated by the closed arrows. At the top of the tower the dispersed phase compresses and forms an essentially continuous collapsed phase of less dense material extending upward from the sharp concentration gradient 19 near the top of the tower to the top of the tower. As the inventory of the less dense material, in this case the wax-oil coolant slurry, builds up in column 2, it is collapsed and compressed in the constriction 21 and 23 at the top of column 2. In the drawing the collapsed dispersed phase of the less dense material, that is the wax-oil coolant slurry, is indicated by 10 and 10A. It should be noted that this is not an essential part of this invention. This invention can be utilized successfully without having a collapsed dispersed phase.

The warm coolant is removed from the bottom of column 2 through line 7 and can be cooled by conventional means, such as by direct contact with a vaporizing auto-refrigerant or by indirect heat exchange. In accordance with one embodiment of the present invention, the coolant is removed through line 7 and is continuously fed to direct contact cooling vessel 9 via pump 31. In vessel 9 it is directly contacted with a cold liquid auto-refrigerant under pressure, such as propane, at a temperature of about —44° F. and at a pressure of about 0 p.s.i.g. The coolant and liquid auto-refrigerant are intimately mixed and the propane allowed to slowly vaporize at a controlled rate and the vapor is removed through line 14. Vaporization of the liquefied propane provides refrigeration, cooling the warm coolant from a temperature of about 65° F. to a temperature of about —35° F. Cold liquid coolant is removed through line 14 via pump 16 and is introduced into chilling column 2 through line 4'.

Impeller 25 attached to shaft 26 aids in collapsing and compressing dispersed phase droplets 6 in the top of the tower. The inverted cone 21 and conical means 23 further compress the dispersed phase to form a plug of compressed dispersed phase 10 and 10A, forming a pressure seal in the top of the tower and allowing the positive pressure in the top of the tower to act on this material to force it out of the tower. The tower in this embodiment is operated at a positive pressure of 15 to 1500 p.s.i.g., thereby providing the driving force for pushing out the crystallized product from the tower.

In order to illustrate the advantages of the instant invention, the following examples are offered.

*Example 1*

The additive utilized in this example comprises a mixture of 0.0026 wt. percent saponin and 0.003 wt. percent Igepal as the surfactant, 0.0057 wt. percent gelatin as the protein and 0.0138 wt. percent of polyethylene glycol as the macromolecule. The Igepal utilized was Igepal CO 630 which had a configuration of

$$C_9H_{17}C_6H_4O(CH_2CH_2O)_{10}CH_2CH_2OH$$

The polyethylene glycol had a molecular weight of about 6,000. The components were mixed in water. An apparatus identical to the figure was utilized in this example. The additive was inserted in container 16' and then introduced into the cold coolant through line 16". The cold coolant was in this case 29 wt. percent calcium chloride brine. The feed to be dewaxed was Solvent 100 Neutral having a cloud point of 95° F. The feed to be utilized was introduced into the tower at a rate of 230 cu. ft. per sq. ft. of column cross section per hour. Coolant is introduced into the tower at a rate of 220 cu. ft. per sq. ft. of column cross section per hour. The orifice holes in ring 12 were about 0.25 inch in diameter. The volume holdup in the tower was about 20%. The feed was introduced into the tower at a temperature of about 80° F. Coolant was introduced into the tower at a temperature of —30° F. The temperature approaches at both ends of the tower were 6° F. The continuous coolant phase countercurrently contacted the rising dense dispersion of oil droplets cooling them at a controlled rate of 100° F. per minute while maintaining the temperature difference between the dispersed phase droplet and the coolant phase of about 6° F. No sticking whatsoever was observed in the tower. Additionally, there was no coalescing or drop breakup. The heat transfer coefficient within the tower was 2700 B.t.u.'s per hour per cubic foot ° F.

*Example 2*

In this example, the same exact conditions as in Example 1 were utilized except there was no addition of a complex which comprises a surfactant, protein and a macromolecule. In this case, considerable drop sticking was observed and the heat transfer coefficient was only 800 B.t.u.'s per hour per cubic foot ° F.

These two examples indicate the great value of the instant invention. Heat transfer rate was 3 to 4 times greater in Example 1 than in Example 2. Since conditions were identical except for the use of the additive, it is apparent that the additive of the instant invention results in a truly great savings in heat.

*Example 3*

In this example, the same conditions as in Example 1 were utilized except that instead of an additive comprising protein, surfactant and a macromolecule, only protein was added in this example. The protein was in the form of gelatin and substantially similar results to Example 2 were achieved.

*Example 4*

In this example, conditions identical to Example 1 were utilized except that the additive comprised only a macromolecule, polyethylene glycol of a molecular weight of 6,000. Results substantially identical to those obtained in Example 2 were obtained in this instance.

*Example 5*

In this example, the same conditions as in Example 1 are utilized with the exception that the surfactant comprises only saponin and not a mixture of saponin and Igepal. The saponin is present in a quantity of 0.53 wt. percent. The remainder of the additive is gelatin, 0.53 wt. percent, and polyethylene glycol having a molecular weight of 6,000 and present in a quantity of 7.64 wt. percent. The heat transfer coefficient within the tower of 1600 B.t.u.'s/hr./ft.$^3$ °F. is found and additionally, some minor drop sticking is observed. However, it is not nearly as acute as in Examples 2, 3 and 4 as evidenced by the superior heat transfer rate.

*Example 6*

In this example, the same conditions as in Example 1 are utilized except that the surfactant in the additive comprises only Igepal in the quantity of 0.5 wt. percent; the remainder of the additive has exactly the same composition as in Example 1. Heat transfer rate within the tower is about 1600 B.t.u.'s/hr. ft.$^3$ °F. Some minor sticking of droplets and severe drop breakup are observed in the tower but the sticking is not nearly as great as in Examples 2, 3 and 4 as evidenced by the improved heat transfer rate.

What is claimed is:

1. In a process for dewaxing a hydrocarbon fraction comprising crystallizing said wax from said fraction by countercurrently contacting said fraction in a tower zone with an immiscible coolant, said coolant being introduced at a temperature below the wax crystallization temperature of said feed, said feed being introduced into said tower zone above its wax crystallization temperature in the form of a dense dispersion of essentially uniform diameter droplets which move in the tower zone countercurrently to the continuous phase coolant, the dispersed phase feed gradually being cooled from its feed temperature to its wax crystallization temperature by direct contact with the coolant thereby growing wax crystals within each of said droplets, separating wax-oil slurry from said coolant and separating crystallized wax from the said wax-oil slurry, the improvement which comprises adding an additive comprising a surfactant, a heat transfer aid selected from the group consisting of macromolecules and protein to the said tower zone whereby heat transfer within the tower is maximized.

2. In a process for dewaxing a hydrocarbon fraction comprising crystallizing said wax from said fraction by countercurrently contacting said fraction in a tower zone with an immiscible coolant, said coolant being introduced at a temperature below the wax crystallization temperature of said feed, said feed being introduced into said tower zone above its wax crystallization temperature in the form of a dense dispersion of essentially uniform diameter droplets which move in the tower zone countercurrently to the continuous phase coolant, the dispersed phase feed gradually being cooled from its feed temperature to its wax crystallization temperature by direct contact with the coolant thereby growing wax crystals within each of said droplets, separating wax-oil slurry from said coolant and separating crystallized wax from the said wax-oil slurry, the improvement which comprises adding an additive comprising a mixture of saponin and $$RC_6H_4O(CH_2CH_2O)_{n-1}CH_2CH_2OH$$

where R is chosen from the group consisting of $C_8H_{17}$, $C_9H_{19}$ and $C_{10}H_{21}$ and polyglycol of a molecular weight of between 500 and 12,000 and gelatin to the said tower zone whereby heat transfer within the tower is maximized.

3. The process of claim 2 wherein the polyglycol is selected from the group consisting of polypropylene glycol and polyethylene glycol.

4. In a process for dewaxing a hydrocarbon fraction comprising crystallizing said wax from said fraction by countercurrently contacting said fraction in a tower zone with an immiscible coolant, said coolant being introduced at a temperature below the wax crystallization temperature of said feed, said feed being introduced into said tower zone above its wax crystallization temperature in the form of a dense dispersion of essentially uniform diameter droplets which move in the tower zone countercurrently to the continuous phase coolant, the dispersed phase feed gradually being cooled from its feed temperature to its wax crystallization temperature by direct contact with the coolant thereby growing wax crystals within each of said droplets, separating wax-oil slurry from said coolant and separating crystallized wax from the said wax-oil slurry, the improvement which comprises adding an additive, said additive comprising a mixture of saponin, $$RC_6H_4O(CH_2CH_2O)_{n-1}CH_2CH_2OH$$

where R is selected from the group consisting of $C_8H_{17}$, $C_9H_{19}$ and $C_{10}H_{21}$ and $n$ may vary from 4 to 30, gelatin and polyethylene glycol of molecular weight from 5,000 to 6,000, to said tower zone whereby heat transfer within the said tower zone is maximized.

5. The process of claim 4 wherein the saponin is present in a range of 0.002 to 0.03 wt. percent, $$RC_6H_4O(CH_2CH_2O)_{n-1}CH_2CH_2OH$$

is present in the amount of 0.0003 to 0.003 wt. percent, gelatin is present in the amount of 0.006 to 0.06 wt. percent, and polyethylene glycol is present in the amount of 0.01 to 0.15 wt. percent.

6. The process of claim 4 wherein the coolant is brine.

7. The process of claim 4 wherein the additive comprises a mixture of $RC_6H_4O(CH_2CH_2O)_{n-1}CH_2CH_2OH$ where R is selected from the group consisting of $C_8H_{17}$, $C_9H_{19}$ and $C_{10}H_{21}$ and $n$ may vary from 4 to 30, gelatin and polyethylene glycol of molecular weight from 5,000 to 6,000, to said tower zone whereby heat transfer within the said tower zone is maximized.

8. The process of claim 4 wherein the additive comprises a mixture of saponin, gelatin and polyethylene glycol of molecular weight from 5,000 to 6,000, to said tower zone whereby heat transfer within the said tower zone is maximized.

9. In a process for dewaxing a very crystalline petroleum hydrocarbon fraction comprising crystallizing wax in said fraction by countercurrently contacting said fraction with an immiscible coolant, said coolant being introduced into one end of a tower zone at a temperature below the wax crystallization temperature of the said feed and said fraction being introduced into the other end of said tower zone at a temperature above its wax crystallization temperature, said fraction being introduced in the form of a dense dispersion of essentially uniform diameter droplets, the droplets being gradually cooled in the tower to the crystallization temperature of the wax, said tower being operated under positive pressure, said dispersed phase containing crystallized wax is clasped in the top of said tower zone and gradually compressed to form a continuous zone consisting essentially of wax-hydrocarbon slurry forming a pressure seal against which the positive pressure in said tower zone acts to push said compressed material out of said tower zone separating a crystallized wax from the wax-hydrocarbon slurry, the improvement which comprises adding to the said coolant an additive which comprises a surfactant, a macromolecule with a weight range of 600 to 1200 and a protein.

10. In a process for dewaxing a very crystalline petroleum hydrocarbon fraction comprising crystallizing wax in said fraction by countercurrently contacting said fraction with an immiscible coolant, said coolant being introduced into one end of a tower zone at a temperature below the wax crystallization temperature of the said feed and said fraction being introduced into the other end of said tower zone at a temperature above its wax crystallization temperature, said fraction being introduced in the form of a dense dispersion of essentially uniform diameter droplets, the droplets being gradually cooled in the tower to the crystallization temperature of the wax, said tower being operated under positive pressure, said dispersed phase containing crystallized wax is clasped in the top of said tower zone and gradually compressed to form a continuous zone consisting essentially of wax-hydrocarbon slurry forming a pressure seal against which the positive pressure in said tower zone acts to push said compressed material out of said tower zone separating a crystallized wax from the wax-hydrocarbon slurry, the improvement which comprises adding to the said coolant an additive which comprises saponin, $$RC_6H_4O(CH_2CH_2O)_{n-1}CH_2CH_2OH$$

wherein R is selected from the group consisting of $C_8H_{17}$, $C_9H_{19}$ and $C_{10}H_{21}$ and $n$ varies from 1.5 to 100, polyethylene glycol with a weight range of 600 to 12,000 and gelatin.

11. The process of claim 10 wherein the polyethylene glycol ranges in weight from 5,000 to 6,000.

12. The process of claim 10 where $n$ varies between 4 and 30.

13. The process of claim 10 wherein said coolant is brine.

14. In a process for dewaxing a very crystalline petroleum hydrocarbon fraction comprising crystallizing wax in said fraction by countercurrently contacting said fraction with an immiscible coolant, said coolant being introduced into one end of a tower zone at a temperature below the wax crystallization temperature of the said feed and said fraction being introduced into the other end of said tower zone at a temperature above its wax crystallization temperature, said fraction being introduced in the form of a dense dispersion of essentially uniform diameter droplets, the droplets being gradually cooled in the tower to the crystallization temperature of the wax, said tower being operated under positive pressure, said dispersed phase containing crystallized wax is clasped in the top of said tower zone and gradually compressed to form a continuous zone consisting essentially of wax-hydrocarbon slurry forming a pressure seal against which the positive pressure in said tower zone acts to push said compressed material out of said tower zone separating a crystallized wax from the wax-hydrocarbon slurry, the improvement which comprises adding to the said coolant an additive which comprises saponin, $$C_9H_{17}C_6H_4O(CH_2CH_2O)_9CH_2CH_2OH$$

polyethylene glycol with a weight range of 5,000 to 6,000 and gelatin.

15. The process of claim 14 wherein said additive is first dissolved in water and then added to the said coolant.

16. The process of claim 14 wherein the said coolant is brine.

17. The process of claim 14 wherein saponin is present in the amount of 0.002 to 0.03 wt. percent, $$C_9H_{17}C_6H_4O(CH_2CH_2O)_9CH_2CH_2OH$$

is present in the amount of 0.0003 to 0.003 wt. percent, gelatin is present in the amount of 0.006 to 0.06 wt. percent and polyethylene glycol is present in the amount of 0.001 to 0.15 wt. percent.

18. The process of claim 17 wherein said petroleum fraction is Solvent 100 Neutral having a boiling range of 670° to 800° F. and a viscosity of 100 SSU at 100° F.

19. The process of claim 17 wherein said petroleum fraction is Solvent 450 Neutral having a boiling range of 800° to 950° F. and a viscosity of 450 SSU at 100° F.

20. The process of claim 17 wherein said petroleum fraction is a distillate fraction boiling under 900° F.

21. In a process for separating a crystallizable component from a solution comprising crystallizing said component from said solution by countercurrently contacting said solution in a tower zone with an immiscible coolant, said coolant being introduced at a temperature below the crystallization temperature of said coolant in said feed, said feed being introduced into said tower zone above its component crystallization temperature in the form of a dense dispersion of essentially uniform diameter droplets which move in the tower zone countercurrently to the continuous phase coolant, the dispersed phase gradually being cooled from its said temperature to its component crystallization temperature by direct contact with the coolant thereby growing component crystals within each of said droplets separating the crystallized component mother liquor slurry from said coolant and separating the crystallized component from said crystallized component mother liquor slurry, the improvement which comprises adding an additive comprising a surfactant, a macromolecule and a protein to the said tower zone whereby heat transfer within the tower is maximized.

22. The process of claim 21 which comprises adding an additive comprising a surfactant with at least one macromolecule complexed to that portion of the surfactant which is phobic to the droplet phase.

23. The process of claim 1 which comprises adding an additive comprising a surfactant with at least one macromolecule complexed to that portion of the surfactant which is phobic to the oil phase.

References Cited by the Examiner

UNITED STATES PATENTS

| 271,080 | 1/1883 | Kells | 208—37 |
|---|---|---|---|
| 2,005,988 | 1/1935 | Brown | 208—37 |
| 2,301,965 | 11/1942 | Mauro et al. | 208—33 |
| 2,698,279 | 12/1954 | Mondria | 208—33 |
| 2,927,078 | 3/1960 | Nathan | 252—8.3 |
| 2,961,397 | 11/1960 | Moscrip | 208—33 |
| 3,096,777 | 7/1963 | Parks et al. | 252—8.3 |
| 3,162,601 | 12/1964 | Jones | 252—8.55 |
| 3,178,899 | 4/1965 | Torobin et al. | 62—58 |

DANIEL E. WYMAN, *Primary Examiner.*

P. E. KONOPKA, *Assistant Examiner.*